United States Patent [19]
Ishii et al.

[11] Patent Number: 5,632,964
[45] Date of Patent: May 27, 1997

[54] CLEANING METHOD FOR EXHAUST GAS CONTAINING AMMONIA AND SILANE

[75] Inventors: Yasu Ishii; Noboru Akita, both of Kanagawa, Japan

[73] Assignee: Japan Pionics Co., Ltd., Tokyo, Japan

[21] Appl. No.: 451,134

[22] Filed: May 26, 1995

[30] Foreign Application Priority Data

Jun. 13, 1994 [JP] Japan .................. 6-155316

[51] Int. Cl.$^6$ .................. B01D 53/58; B01D 53/64; B01D 53/72; B01D 53/04
[52] U.S. Cl. .................. 423/210; 423/237; 423/245.1
[58] Field of Search .................. 423/210, 237, 423/245.1

[56] References Cited

U.S. PATENT DOCUMENTS

| | | | |
|---|---|---|---|
| 1,559,980 | 11/1925 | Perrott | 423/237 |
| 4,784,837 | 11/1988 | Kitayama et al. | 423/210 |
| 5,024,823 | 6/1991 | Gokcek | 423/210 |
| 5,290,393 | 3/1994 | Nakamura | 437/133 |
| 5,320,817 | 6/1994 | Hardwick | 423/237 |

FOREIGN PATENT DOCUMENTS

| | | |
|---|---|---|
| 0 294 142 | 12/1988 | European Pat. Off. . |
| 0 309 099 | 3/1989 | European Pat. Off. . |
| 0 570 835 A1 | 11/1993 | European Pat. Off. . |
| 2 609 905 | 7/1988 | France . |
| A2609905 | 7/1988 | France . |
| 62-152516 | 7/1987 | Japan .................. 423/210 |
| 62-152515 | 7/1987 | Japan .................. 423/210 |
| 5-154333 | 6/1993 | Japan .................. 423/237 |
| 965488 | 10/1982 | U.S.S.R. .................. 423/237 |
| 1000772 | 8/1965 | United Kingdom .................. 423/237 |

OTHER PUBLICATIONS

Sales Brochure from Messer Griesheim GmbH, "TOXISORB—Safe Disposal of Spent Process Gases", copyright 1990, Dusseldorf, German Federal Republic.

Derwent Abstract—JP#012219, Nipon Pionics, Jan. 21, 1991.

*Primary Examiner*—Steven Bos
*Assistant Examiner*—Peter T. DiMauro
*Attorney, Agent, or Firm*—Sughrue, Mion, Zinn, Macpeak & Seas

[57] ABSTRACT

A cleaning method for an exhaust gas containing ammonia, silanes, and organometallic compounds exhausted from a nitride film production step, etc., for producing compound semiconductors.

After removing the silanes and the organometallic compounds from the exhaust gas by contacting the exhaust gas with a cleaning agent comprising soda lime having provided thereon a copper(II) salt, the exhaust gas is contacted with an ammonia decomposition catalyst to decompose ammonia into hydrogen and nitrogen, and undecomposed ammonia in the remaining exhaust gas is then removed by a cleaning agent comprising an inorganic carrier having provided thereon a copper(II) salt, or an active carbon having provided thereon copper sulfate.

21 Claims, 1 Drawing Sheet

FIGURE
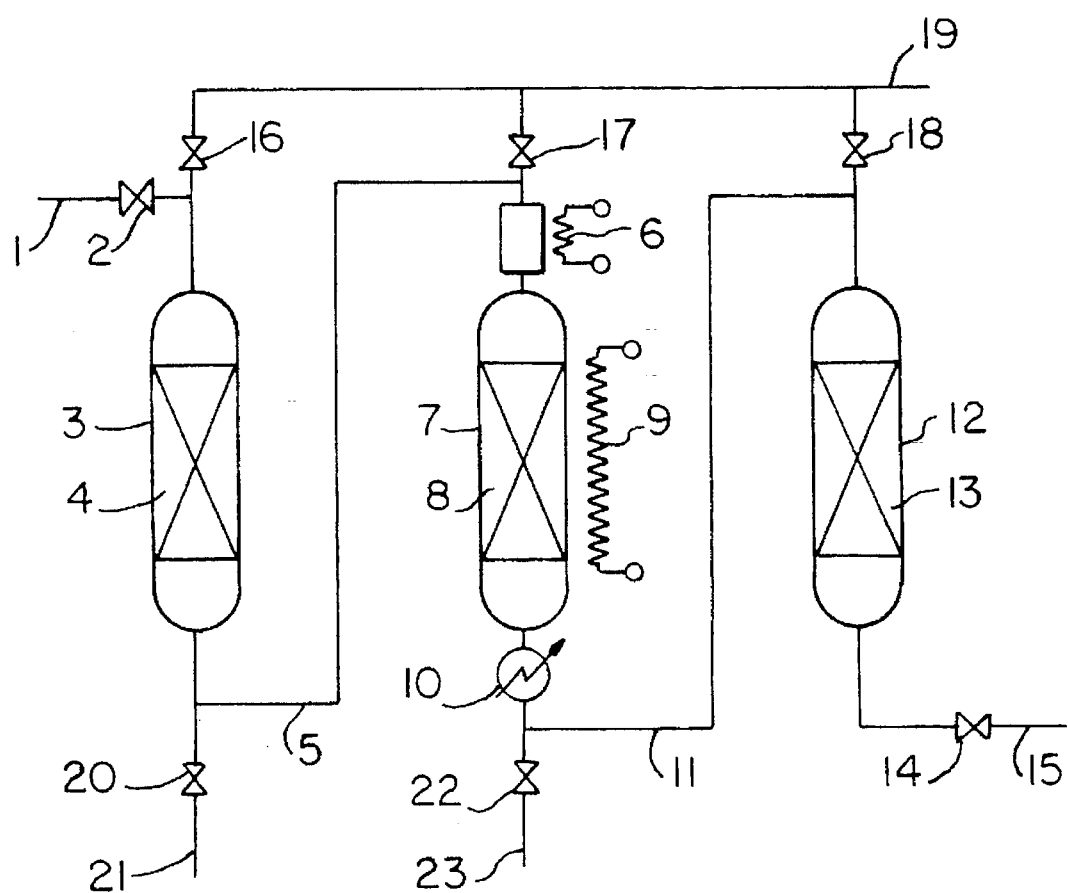

CLEANING METHOD FOR EXHAUST GAS CONTAINING AMMONIA AND SILANE

FIELD OF THE INVENTION

The present invention relates to a cleaning method for an exhaust gas, and more particularly to a cleaning method for an exhaust gas containing harmful gases used in semiconductor production steps, such as ammonia, monosilane, disilane, trimethylsilane, triethylsilane, trimethyl gallium, triethyl gallium, trimethyl indium, triethyl indium, etc.

BACKGROUND OF THE INVENTION

Recently, with the developments of a semiconductor production industry, an optoelectronics production industry, a precision instrument production industry, a hard metal material production industry, an ornaments production industry, etc., various gases have been used.

Of those gases, harmful gases such as monosilane, disilane, trimethylsilane, triethylsilane, trimethyl gallium, triethyl gallium, trimethyl indium, triethyl indium, etc., in addition to ammonia are used in a nitride film production step for the production of compound semiconductors. These gases are indispensable materials in the production steps of compound semiconductors, but these gases each has a high toxicity and when unreacted gases are released in the air after use, they give bad influences on the human bodies and the environment.

The allowable concentrations of these gases are, for example, that the concentration of ammonia is 25 ppm, and the concentration of monosilane is 5 ppm. Therefore, the gases containing these harmful gases must be cleaned prior to releasing in the air after use in a semiconductor production step, etc.

Of these harmful gases, in particular, an ammonia gas is sometimes used as a mixture with a hydrogen gas or a nitrogen gas at a relatively high concentration of the ammonia gas of from 1 to 30 vol %. In addition, monosilane, disilane, trimethylsilane, triethylsilane, and the like are further added thereto at a concentration of from 1 to 1,000 ppm, and trimethyl gallium, triethyl gallium, trimethyl indium, triethyl indium, and the like are further added thereto at a concentration of from about 0.01 to 1 vol %.

The gas mixture containing these harmful gases is used in a compound semiconductor production step, and the unreacted gas is then made harmless by removing the harmful gases prior to release in the air. However, a method of efficiently cleaning the gas mixture at a low cost has not yet been developed and thus the development of such a method has been strongly desired.

Conventional cleaning methods for an exhaust gas containing ammonia in a relatively high concentration and also containing a silane such as monosilane, disilane, or trimethylsilane, and an organometallic compound such as trimethyl indium, or trimethyl gallium are (1) a method of contacting the exhaust gas with an aqueous solution of sulfuric acid, etc., to absorb the exhaust gas into the aqueous solution, thereby catching ammonia as ammonium sulfate and other harmful components as the oxides or sulfates in the aqueous solution; (2) a method of introducing the exhaust gas into a combustion furnace and removing ammonia as water and nitrogen, and other harmful components as water, a carbonic acid gas, and oxides; (3) a method of contacting the exhaust gas with each dry-type cleaning agent corresponding to each harmful component contained in the exhaust gas; and the like.

However, the above methods have the following disadvantages.

That is, in the method (1) of contacting the exhaust gas with the aqueous solution of sulfuric acid, etc., and absorbing the harmful components in the solution, the harmful gases such as ammonia, monosilane, trimethyl gallium, trimethyl indium, etc., can be removed, but there are inconveniences that the removal ratio thereof is low, whereby the concentrations of the harmful gases cannot be lowered to the environmental standard allowable concentrations, and also that a large amount of ammonium sulfate is by-produced in the cleaning treatment, and solid matters such as silicon oxides, indium oxides or gallium oxides are contained in the treating solution. In the method (2) of making the exhaust gas harmless by introducing the exhaust gas into a combustion furnace and burning the harmful components in the furnace, not only there is an inconvenience that since the exhaust gas is not released under a stationary state, the method involves a danger of an incomplete combustion, an abnormal combustion, or an explosion but also there is a fault that nitrogen oxides which are harmful materials are newly by-produced by the combustion treatment. In the case of the method (3) of making the exhaust gas harmless by contacting the exhaust gas with a dry-type cleaning agent, by using the combination of each cleaning agent according to the kind of a harmful gas, all the harmful components can be removed but there are faults that a large amount of a cleaning agent is required for cleaning an ammonia gas contained in the exhaust gas in a relatively high concentration and a very large treatment apparatus is required for the method.

As described above, the development of an exhaust gas cleaning method, wherein the cleaning apparatus is small-sized, the cleaning efficiency is high, and the treatment after cleaning can be easily carried out, has been strongly desired.

SUMMARY OF THE INVENTION

As a result of various investigations to overcome these problems as described above, it has been found that in the treatment of an exhaust gas containing ammonia, silanes, and organometallic compounds, the combination of the treatment by dry-type cleaning agents and the catalytic decomposition by an ammonia decomposition catalyst makes it possible to safely remove these harmful gases with a very high efficiency. The present invention has been attained based on this finding.

Accordingly, an object of the present invention is to provide a cleaning method for an exhaust gas containing a relatively large amount of ammonia.

The present invention provides a cleaning method for an exhaust gas containing ammonia, a silane, and an organometallic compound, which comprises contacting the exhaust gas with a cleaning agent A to remove the silanes and the organometallic compounds, contacting the remaining exhaust gas with an ammonia decomposition catalyst to decompose the ammonia into hydrogen and nitrogen, and then contacting the remaining exhaust gas with a cleaning agent B to remove undecomposed ammonia.

BRIEF DESCRIPTION OF THE DRAWING

The attached Figure is a schematic view showing the constitution of an exhaust gas cleaning apparatus.

DETAILED DESCRIPTION OF THE INVENTION

The cleaning method of the present invention is that gases of silanes and organometallic compounds, which become the catalyst poisons of an ammonia decomposition catalyst, such as monosilane, disilane, trimethylsilane, triethylsilane, trimethyl gallium, triethyl gallium, trimethyl indium, or triethyl indium, are removed by contacting the exhaust gas containing these harmful gases with a dry-type cleaning agent A, the remaining exhaust gas is contacted with an ammonia decomposition catalyst to decompose ammonia into hydrogen and nitrogen, and the remaining exhaust gas containing undecomposed ammonia is then contacted with a dry-type ammonia cleaning agent B to remove the undecomposed ammonia. In other words, according to the method of the present invention, by cleaning the greater part of ammonia contained in the exhaust gas in a relatively large amount by catalytically decomposing ammonia, the load of the ammonia cleaning agent can be greatly reduced.

The method of the present invention is applied to clean the exhaust gas composed of a gas such as a hydrogen gas, a nitrogen gas, an argon gas, a helium gas, etc., containing silanes and organometallic compounds together with ammonia.

In particular, the cleaning method of the present invention can surely and quickly clean the exhaust gas containing a large amount of ammonia and the method of the invention gives an excellent effect in cleaning a harmful exhaust gas exhausted from, for example, a semiconductor production step, etc.

In the present invention, for example, soda lime or soda lime having provided thereon a copper(II) compound can be used as the cleaning agent A for the silanes and organometallic compounds.

Soda lime is prescribed by JIS K8603 as a reagent and is a material composed of, as the chemical components, calcium hydroxide as the main component and a small amount of sodium hydroxide. Soda lime is commercially available as an amorphous particle form or granular form and is usually marketed as No. 1 Article (particle size: 1.5 to 3.5 mm), No. 2 Article (particle size: 3.5 to 5.5 mm), No. 3 Article (particle size: 5.5 to 7.0), etc., classified according to the particle sizes thereof. These marketed articles usually contain from about 5 to 20 wt %, based on the weight of dry article, of water which is liberated at a temperature of from 100° C. to 200° C., and can be directly used as the cleaning agents.

The cleaning agent composed of soda lime having provided thereon a copper(II) compound, which can be used is soda lime as described above having provided thereon copper oxide or basic copper carbonate in an amount of usually from 0.2 to 100 parts by weight, and preferably from 2 to 60 parts by weight copper, calculated as copper per 100 parts by weight of soda lime.

The method of applying the copper(II) compound onto the soda lime includes a method of covering soda lime with the powder of copper oxide, basic copper carbonate, etc.; a method of covering soda lime with copper oxide, basic copper carbonate, etc., in a paste state followed by drying; and the like. In any cases, where soda lime contains free water, the cleaning agent shows a high cleaning ability, and hence soda lime containing free water in an amount of from about 2 to 40 wt %, and preferably from about 5 to 20 wt %, based on the weight of dry soda lime is preferred.

The cleaning agent A is usually packed in a cleaning column made of a metal or a synthetic resin, and is used as a fixed bed. The packing length of the cleaning agent A is determined according to the particle size of the cleaning agent A, the gas flow rate, the pressure loss, etc., but is usually from 20 to 1,000 mm, and preferably from 50 to 500 mm. The contact condition of the cleaning agent A with the gas to be treated differs according to the concentrations of the silanes and the organometallic compounds contained in the gas to be treated, and hence cannot generally be specified but the linear space velocity in the column is usually 10 cm/second or less, and preferably 1 cm/second or less. Further, the contact temperature of the gas to be treated with the cleaning agent A is preferably 100° C. or lower and the contact treatment can be usually carried out at room temperature. The contact pressure may be atmospheric pressure, a reduced pressure, or an applied pressure, but the contact treatment is usually carried out under a pressure of from 1 to 6 kg/cm$^2$ abs. from the easiness of the operation.

The catalytic decomposition catalyst of ammonia which is usually used is a nickel catalyst, an iron catalyst, or a palladium catalyst. Those catalysts can be used alone or as mixtures thereof.

The nickel catalyst which can be used is a carrier such as alumina, etc., having provided thereon nickel in an amount of from about 3 to 50% by weight based on the weight of alumina, and the iron catalyst which can be used is an alumina carrier, etc., having provided thereon di-iron trioxide in an amount of from about 1 to 20% by weight based on the weight of alumina. Further, the palladium catalyst which can be used is an alumina carrier having provided thereon palladium in an amount of from about 0.1 to 5% by weight based on the weight of alumina. Examples of the carrier further include silica, zirconia and titania.

Those ammonia decomposition catalysts are commercially available, and those catalysts can be used in the present invention.

There is no particular restriction on the form of the ammonia decomposition catalyst and the catalyst is usually packed in a cleaning column as a ring form, a tablet form, a columnar form, a spherical form, etc., and is used as a fixed bed. Further, by selecting the form and the size of the catalyst, the catalyst can be used as a moving bed or a fluidized bed.

The packed length of the ammonia decomposition catalyst in the case of using the catalyst by packing in a column is from about 50 to 3,000 mm but is usually determined according to the concentration of ammonia in the gas to be treated, the reaction temperature, the pressure loss, the heat-supplying condition, etc.

For the conditions of the catalytic decomposition of ammonia, there is no restriction on the concentration of ammonia in the gas to be treated and even where the concentration of ammonia reaches 100% by an erroneous operation or a nonstationary operation of an apparatus, ammonia can be decomposed in the exhausted state as it is. The reaction temperature in carrying out the decomposition of ammonia is from 450° C. to 1,200° C., and preferably from 600° C. to 900° C. Also, as the reaction pressure, a lower pressure is more preferred and the reaction can be practiced under a pressure of atmospheric pressure or lower but from the standpoint of the operability, the pressure is usually from 0 to 35 kg/cm$^2$, and preferably from 1 to 5 kg/cm$^2$.

The linear velocity (LV) in a column of the gas in the ammonia decomposition column is determined according to the concentration of the ammonia gas, the packed length of the decomposition catalyst, the reaction temperature, etc., but is usually from 1 to 200 cm/second, and preferably from 5 to 50 cm/second, at 0° C. and calculated as atmospheric pressure.

Materials of constituting the ammonia decomposition column which are preferably used are metallic materials which can endure the reaction temperature condition and are difficult to cause hydrogen embrittleness and nitriding by hydrogen and nitrogen, respectively, contained in the exhaust gas and also formed by the decomposition of ammonia. Examples thereof are nickel.chromium alloys, Incoloy 800, Inconel 600, etc., (trade names, made by INCO Co.).

The ammonia decomposition reaction is an endothermic reaction, and as a result, for maintaining the catalyst packed portion of the ammonia decomposition column at the reaction temperature, the decomposition column can be heated by a method of equipping a heating furnace to the outside of the column or a method of placing heaters in the catalyst packed portion.

In introducing the exhaust gas to be treated into the ammonia decomposition column, after heating the exhaust gas by a method of heating the exhaust gas to a temperature near the reaction temperature by a pre-heating means or a method of pre-heating the exhaust gas by heat exchanging the exhaust gas with the outlet gas of the ammonia decomposition column, the exhaust gas can be introduced into the ammonia decomposition column.

Examples of the cleaning agent B for removing ammonia which can be used are active carbon having provided thereon copper sulfate, an inorganic carrier having provided thereon a copper(II) salt, and the like.

Examples of the active carbon having provided thereon copper sulfate are active carbons such as coconut husk carbon, charcoal, bone black, and peat, having provided thereon copper sulfate.

The surface area of the active carbon used in the present invention is at least 200 $m^2/g$, and preferably at least 500 $m^2/g$, and the active carbon having provided thereon copper sulfate in an amount of from 3 to 100 parts by weight, and preferably from 10 to 80 parts by weight as the pentahydrate of copper sulfate, per 100 parts by weight of the active carbon is used.

For increasing the cleaning efficiency of ammonia, the cleaning agent B containing free water in addition to the crystallization water of copper sulfate is preferably used, and the cleaning agent B containing from 1 to 50% by weight, and preferably from 10 to 40% by weight, of free water based on the total weight of the dry cleaning agent B can be used.

Examples of the inorganic carrier having provided thereon a copper(II) salt which can be used are an alumina carrier, a silica carrier, a titania carrier, a zirconia carrier, or a metal oxide carrier composed of copper oxide, manganese oxide, etc., as the main components, applied with a copper (II) salt, and the like.

Those carriers generally have a specific surface area of 1 $m^2/g$ or less, and preferably from 0.001 to 0.5 $m^2/g$, but carriers having a specific surface area of from 1 to 100 $m^2/g$ can also be used, if required and necessary.

Also, the carrier composed of copper(II) oxide, manganese(II) oxide, etc., as the main components, which can be used is, for example, a carrier composed of at least 60% by weight of copper oxide and manganese oxide at a weight ratio of from 1/0.8 to 1/5 as the main components and containing aluminum oxide, silicon oxide, cobalt oxide, silver oxide, etc., as other components.

Examples of the copper(II) salt are copper salts of inorganic acids and copper salts of organic salts. Examples of the copper salts of inorganic acids are the copper(II) salts of carbonic acid, nitric acid, sulfuric acid, hydrochloric acid, and chloric acid, and examples of the copper salt(II) of organic acids are the copper(II) salts of formic acid, acetic acid, oxalic acid, and naphthenic acid. The copper(II) salt is applied to the carrier such as the alumina carrier, the silica carrier, the titania carrier, the zirconia carrier or the carrier composed of copper oxide and manganese oxide as the main components in an amount of from 3 to 100 parts by weight, and preferably from 10 to 80 parts by weight as Cu, per 100 parts by weight of the carrier.

The inorganic carrier having provided thereon the copper (II) salt containing a certain amount of free water is preferably used and the content of free water in such a preferred inorganic carrier is from 1 to 50% by weight, and preferably from 5 to 30% by weight, based on the total amount of the dry cleaning agent B.

The cleaning agent B described above is usually packed in a column made by a metal or a synthetic resin and is used as a fixed bed, and it can be also used as a moving bed or a fluidized bed. The packed length of the cleaning agent B in the case of packing the cleaning agent in the column differs according to the particle size of the cleaning agent, the flow rate of the exhaust gas, and the concentration of ammonia in the gas and thus cannot generally be specified, but it is from 50 to 1,500 mm for practical use.

The inside diameter of the ammonia cleaning column is designed such that the linear velocity (LV) in the column of the gas flowing through the inside of the column becomes about from 0.1 to 1.5 m/second and is determined according to the pressure loss of the packed column, the contact efficiency of the gas, and the concentration of ammonia in the gas.

The concentration of ammonia in the exhaust gas in cleaning the exhaust gas by contacting the gas containing ammonia with the cleaning agent B is determined according to the ammonia decomposition condition but is usually 1,000 ppm or less, and preferably 500 ppm or less, and after cooling the gas discharged from the outlet of the ammonia decomposition column, the gas can be treated as it is.

The contact temperature of the exhaust gas with the cleaning agent B is from about 0° C. to 90° C., the contact treatment is usually carried out at room temperature, and heating or cooling is not required. The pressure at the contact treatment generally is atmospheric pressure, but the contact treatment can be carried out under a reduced pressure such as 0 to 1 $kg/cm^2$ abs., or an applied pressure such as 5 $kg/cm^2$ abs.

The present invention is practically described below by referring to the accompanying figure showing the cleaning apparatus for the method of the present invention. That is, the Figure is a schematic view showing an embodiment of the construction of the exhaust gas cleaning apparatus used for practicing the method of the present invention.

The exhaust gas containing harmful gases such as ammonia, monosilane, disilane, trimethyl gallium, trimethyl indium, etc., is introduced into a cleaning column 3 for silanes and organometallic compounds from an exhaust gas line 1 through a valve 2. A cleaning agent A4 for cleaning the silanes and the organometallic compounds is packed in the cleaning column 3 and monosilane, disilane, trimethyl gallium, etc., in the exhaust gas are removed. The exhaust gas is preheated by a pre-heating means 6 through a gas line 5, and then introduced into an ammonia decomposition column 7. In the ammonia decomposition column 7 is packed an ammonia decomposition catalyst 8, the ammonia decomposition column 7 is heated by a heater 9, and the greater part of ammonia in the exhaust gas is decomposed into nitrogen and hydrogen. The gas treated in the ammonia decomposition column 7 is cooled in a cooler 10 and is then introduced into a cleaning column 12 through a gas line 11. In the cleaning column 12 is packed a cleaning agent B 13 for ammonia, undecomposed ammonia is removed in the cleaning column 12, and the gas thus treated is discharged from a discharging line 15 through a valve 14.

Where the exhaust gas is treated by the above-described methods, the silanes and the organometallic compounds are removed in the cleaning column 3 and the greater part of ammonia is decomposed in the ammonia decomposition column 7 into nitrogen and hydrogen. The concentration of undecomposed ammonia in the gas at the inlet of the cleaning column 12 differs according to the catalytic decomposition condition but the concentration is usually from 70 ppm to 600 ppm, and undecomposed ammonia is very easily removed in the cleaning column 12.

In addition, a nitrogen gas line 19 is connected to the inlet of each of the cleaning column 3, the pre-heating means 6, and the cleaning column 12 through the valves 16, 17, and 18, respectively such that at the initiation of the treatment of the exhaust gas and at the end of the exhaust gas treatment, the nitrogen gas is used as a gas for purging the inside of the system. Purge lines 21 and 23 each is connected to each outlet portion of the cleaning column 3 and the cooler 10 through the valves 20 and 22, respectively.

The present invention is described in more detail below by reference to the following examples, but it should be understood that the invention is not construed as being limited thereto.

EXAMPLE 1

An aqueous solution of copper sulfate was mixed with an aqueous solution of sodium hydroxide to form the precipitates of copper hydroxide. After washing well the precipitates, the precipitates were dried and then burned to obtain copper oxide. The copper oxide was applied onto a commercially available soda lime #1 article, and the copper oxide was provided on the soda lime in an amount of 8 parts by weight as copper per 100 parts by weight of the soda lime to obtain a cleaning agent A.

The cleaning agent A was packed in a packing column made of stainless steel having an inside diameter of 160 mm and a length of 500 mm at a packed length of 300 mm to obtain a cleaning column for silanes and organometallic compounds.

A reaction pipe made of Incoloy 80 having an inside diameter of 83 mm and a length of 1,000 mm was prepared. In the reaction pipe were packed columnar nickel series ammonia decomposition catalysts each having provided thereon 18 parts by weight of nickel per 100 parts by weight of the alumina and having a diameter of 5 mm and a length of 5 mm at a packed length of 500 mm. An electric heating furnace was equipped to the reaction pipe such that the reaction pipe can be heated from the outside to obtain an ammonia decomposition column.

After immersing spherical m-alumina having a diameter of 3/16 inch in an aqueous solution of copper sulfate, the alumina was dried at 100° C. to obtain a cleaning agent B composed of the alumina having provided thereon copper sulfate in an amount of 30 parts by weight as the pentahydrate of copper sulfate per 100 parts by weight of the alumina. The cleaning agent B was packed in a packing column made of stainless steel having an inside diameter of 78 mm and a length of 500 mm at a packed length of 300 mm to obtain an ammonia cleaning column.

The cleaning column for silanes and organometallic compounds, the ammonia decomposition column, and ammonia cleaning column prepared as described above were connected as shown in the Figure to constitute a cleaning apparatus for an exhaust gas.

After replacing the inside atmosphere of the cleaning apparatus with a nitrogen gas, the ammonia decomposition column was heated to 800° C.

A mixed gas composed of 20% by volume of ammonia, 50 ppm of monosilane, 100 ppm of trimethyl gallium, 40 % by volume of hydrogen, and 40 % by volume of nitrogen was continuously passed through the exhaust gas cleaning apparatus at atmospheric pressure and at a flow rate of 50 NL/minute.

Part of the outlet gas of each of the cleaning columns for silanes and organometallic compounds, the ammonia decomposition column, and the ammonia cleaning column described above was sampled and the concentration of each sampled gas was measured.

Ammonia was measured by a gas chromatograph equipped with a heat conductivity detector and a gas-detecting tube (manufactured by Gastec Ltd., detection limit 0.2 ppm), monosilane was measured by a gas-detector (Model No. TG-4000BA, trade name, manufactured by Bionics Instrument Co., Ltd., detection limit 1 ppm), trimethyl gallium was measured by a gas-detecting agent (manufactured by Japan Pionics Co., Ltd., detection limit 1 ppm), and the time until reaching ammonia in the outlet gas of the ammonia cleaning column to the upper limit of the allowable concentration of ammonia (25 ppm) was measured.

The results obtained from the initiation of flowing the gas mixture to 74 hours since then are as shown in Table 1 below and thereafter (after 74 hours), the concentration of ammonia at the outlet of the ammonia cleaning column exceeded the allowable value.

TABLE 1

| | Concentrations of Harmful Gas Components After Cleaning Treatment | | |
|---|---|---|---|
| | Ammonia | Monosilane | Trimethyl Gallium |
| Outlet of cleaning column for the silane and the organometallic compound | 19.9% | n.d. | n.d. |
| Outlet of ammonia decomposition column | 160–145 ppm | n.d. | n.d. |
| Outlet of ammonia cleaning column | n.d. | n.d. | n.d. | n.d.: No detection

EXAMPLE 2

A spherical catalyst having a diameter of 4.5 mm composed of an alumina carrier having provided thereon di-iron trioxide in an amount of 5 parts by weight per 100 parts by weight of alumina was used as an ammonia decomposition catalyst.

Popcalite (trade name, made by Nissan Girdler Catalyst Co., Ltd.) composed of two components of 40 % by weight of copper(II) oxide and 60% by weight of manganese(IV) oxide, having provided thereon copper oxide in an amount of 30 parts by weight as the pentahydrate of copper oxide per 100 parts by weight of Popcalite was used as a cleaning agent B for removing ammonia.

The cleaning test was carried out in the same manner as in Example 1 except that the cleaning agent B described above was used.

The results from the initiation of flowing the gas mixture to 88 hours since then are as shown in Table 2 below and at the time after 90 hours, the concentration of ammonia at the outlet of the ammonia cleaning column exceeded the allowable value.

TABLE 2

| | Concentrations of Harmful Gas Components After Cleaning Treatment | | |
|---|---|---|---|
| | Ammonia | Monisilane | Trimethyl Gallium |
| Outlet of cleaning column for the silane and the organometallic compound | 20.0% | n.d. | n.d. |
| Outlet of ammonia decomposition column | 165–155 ppm | n.d. | n.d. |
| Outlet of ammonia cleaning column | n.d. | n.d. | n.d. |

EXAMPLE 3

The cleaning test was carried out under the same conditions as in Example 1 except that columnar palladium catalysts each having a diameter 5 mm and a length of 5 mm and composed of an alumina carrier having provided thereon palladium in an amount of 0.5 part by weight per 100 parts by weight of alumina were used as the ammonia decomposition catalyst and the ammonia decomposition reaction temperature was changed to 600° C.

The results from the initiation of flowing the gas mixture to 20 hours since then are as shown in Table 3 below and after 22 hours, the concentration of ammonia at the outlet of the ammonia cleaning column exceeded the allowable value.

TABLE 3

| | Concentrations of Harmful Gas Components After Cleaning Treatment | | |
|---|---|---|---|
| | Ammonia | Monisilane | Trimethyl Gallium |
| Outlet of cleaning column for the silane and the organometallic compound | 20.0% | n.d. | n.d. |
| Outlet of ammonia decomposition column | 520–460 ppm | n. d. | n. d. |
| Outlet of ammonia cleaning column | n.d. | n.d. | n.d. |

COMPARATIVE EXAMPLE 1

The cleaning test was carried out under the same conditions as in Example 1 except that the ammonia decomposition column was not used. The results showed that the temperature of the ammonia cleaning column was raised, and the concentration of ammonia at the outlet of the ammonia cleaning column exceeded the allowable concentration at 2 minutes after the initiation of flowing the gas mixture.

As described above, according to the cleaning method of the present invention, ammonia, silanes, and organometallic compounds, which are relatively largely contained in an exhaust gas exhausted from a nitridation reaction step, etc., can be very efficiently removed.

Further, in the cleaning method of the present invention, in spite of removing a large amount of ammonia, the treatment for removing ammonia can be carried out with a small amount of a cleaning agent and also there is no possibility of by-producing harmful materials by the treatment.

While the invention has been described in detail and with reference to specific embodiments thereof, it will be apparent to one skilled in the art that various changes and modifications can be made therein without departing from the spirit and scope thereof.

What is claimed is:

1. A cleaning method for an exhaust gas containing ammonia, silanes, and organometallic compounds, which comprises contacting the exhaust gas with a cleaning agent A comprising soda lime or soda lime having provided thereon a copper(II) compound to remove the silanes and the organometallic compounds, contacting the exhaust gas thus treated with an ammonia decomposition catalyst comprising an inorganic carrier having provided thereon at least one kind of a metal selected from the group consisting of nickel, iron, and palladium to decompose ammonia in the exhaust gas into hydrogen and nitrogen, and then contacting the remaining exhaust gas with a cleaning agent B comprising an active carbon having provided thereon copper sulfate, or an inorganic carrier having provided thereon a copper(II) salt to remove undecomposed ammonia, thereby resulting in a cleaned exhaust gas containing about 25 ppm or less of ammonia.

2. The cleaning method for an exhaust gas as claimed in claim 1, wherein the silane is at least one silane selected from the group consisting of monosilane, disilane, trimethylsilane, and triethylsilane, and the organometallic compound is at least one compound selected from the group consisting of trimethyl gallium, triethyl gallium, trimethyl indium, and triethyl indium.

3. The cleaning method for an exhaust gas as claimed in claim 1, wherein the exhaust gas is a gas exhausted from a nitride film production step.

4. The cleaning method for an exhaust gas as claimed in claim 1, wherein the copper (II) compound is copper oxide or basic copper carbonate.

5. The cleaning method for an exhaust gas as claimed in claim 1, wherein the copper (II) compound is provided on the soda lime in an amount of from 0.2 to 100 parts by weight calculated as copper per 100 parts by weight of the soda lime.

6. The cleaning method for an exhaust gas as claimed in claim 4, wherein the soda lime contains free water in an amount of from about 2 to 40% by weight based on the weight of dry soda lime.

7. The cleaning method for an exhaust gas as claimed in claim 1, wherein the exhaust gas is contacted with the cleaning agent A at a temperature of 100° C. or lower.

8. The cleaning method for an exhaust gas as claimed in claim 1, wherein the exhaust gas is contacted with the cleaning agent A under a pressure of from 1 to 6 kg/cm$^2$ abs.

9. The cleaning method for an exhaust gas as claimed in claim 1, wherein the ammonia decomposition catalyst is a nickel catalyst comprising an alumina carrier having provided thereon nickel in an amount of from 3 to 50% by weight based on the weight of alumina.

10. The cleaning method for an exhaust gas as claimed in claim 1, wherein the ammonia decomposition catalyst is an iron catalyst comprising an alumina carrier having provided thereon di-iron trioxide in an amount of from 1 to 20% by weight based on the weight of alumina.

11. The cleaning method for an exhaust gas as claimed in claim 1, wherein the ammonia decomposition catalyst is a palladium catalyst comprising an alumina carrier having provided thereon palladium in an amount of from 0.1 to 5% by weight based on the weight of alumina.

12. The cleaning method for an exhaust gas as claimed in claim 1, wherein the exhaust gas is contacted with the ammonia decomposition catalyst at a temperature of from 450° C. to 1,200° C.

13. The cleaning method for an exhaust gas as claimed in claim 1, wherein the exhaust gas is contacted with the ammonia decomposition catalyst under a pressure of from 0 to 35 kg/cm$^2$.

14. The cleansing method for an exhaust gas as claimed in claim 1, wherein said cleaning agent B comprises active carbon, and wherein said active carbon has a surface area of 200 m$^2$/g or more.

15. The cleaning method for an exhaust gas as claimed in claim 1, wherein said cleaning agent B comprises active carbon and copper sulfate, and wherein said copper sulfate is provided on the active carbon in an amount of from 3 to 100 parts by weight calculated as a pentahydrate of copper sulfate per 100 parts by weight of the active carbon.

16. The cleaning method for an exhaust gas as claimed in claim 1, wherein the cleaning agent B contains free water in an amount of from 1 to 50% by weight based on the total weight of the dry cleaning agent B.

17. The cleansing method for an exhaust gas as claimed in claim 1, wherein said cleaning agent B comprises an inorganic carrier, and wherein said inorganic carrier of said cleaning agent B is alumina, silica, zirconia, or a metal oxide comprising copper oxide or manganese oxide.

18. The cleaning method for an exhaust gas as claimed in claim 1, wherein the copper (II) salt is a copper salt of an inorganic acid or a copper salt of an organic acid.

19. The cleaning method for an exhaust gas as claimed in claim 1, wherein the copper (II) salt is provided on the inorganic carrier in an amount of from 3 to 100 parts by weight calculated as Cu per 100 parts by weight of the inorganic carrier.

20. The cleaning method for an exhaust gas as claimed in claim 1, wherein the exhaust gas is contacted with the cleaning agent B at a temperature of from 0° to 90° C.

21. The cleaning method for an exhaust gas as claimed in claim 1, wherein said soda lime is in the form of solid particles packed into a column.

* * * * *